July 4, 1939.  H. A. EVERSON  2,164,873

MUSIC CHART

Filed Jan. 5, 1937

Inventor
HAZEL ANN EVERSON

By W. E. Sherwood
Attorney

Patented July 4, 1939

2,164,873

UNITED STATES PATENT OFFICE 2,164,873

MUSIC CHART

Hazel Ann Everson, Louisville, Ky.

Application January 5, 1937, Serial No. 119,088

1 Claim. (Cl. 84—471)

This invention relates to an improved form of chart adapted for the teaching of music. Charts of this general nature have been suggested heretofore, but due to structural limitations their use has not been entirely satisfactory. In order to teach music in this way with the proper degree of fidelity the chart must provide means for the placement of music characters in an exact prescribed location and give a resulting appearance identical with that of conventional music notation.

Furthermore, since the chart may be subjected to rough treatment when teaching inexperienced children in the classroom, it becomes necessary to construct the same in such a way as to avoid damage resulting from the constant insertion, removal and adjusting of the separate characters of the chart.

The present invention provides a solution to these and similar problems and has as one object the provision of a music chart adapted for teaching the subject in an interest-sustaining manner and on which a musical notation may be set up in exact conformity to a conventional notation.

A second object is the provision of a chart constructed with mutually reinforcing portions serving to avoid damage to the chart resulting from continued use.

A third object is the provision of a chart adapted to hold any conventional music symbol in a desired place thereon and to permit the ready insertion, removal or adjusting of such symbols upon the chart.

A further object is the provision of a chart which is portable and inexpensive in construction and which is light in weight and adapted to be mounted at any convenient classroom location.

A further object is the provision of integral tab means for holding the separate music characters securely in place within reinforced recesses on the chart while affording an easy removal of the same.

Other objects and advantages of the invention will become more apparent when considered in connection with the accompanying drawing in which, Figure 1 is a plan view illustrating one form of chart employing the invention and showing certain music characters in place thereon.

Figure 1:
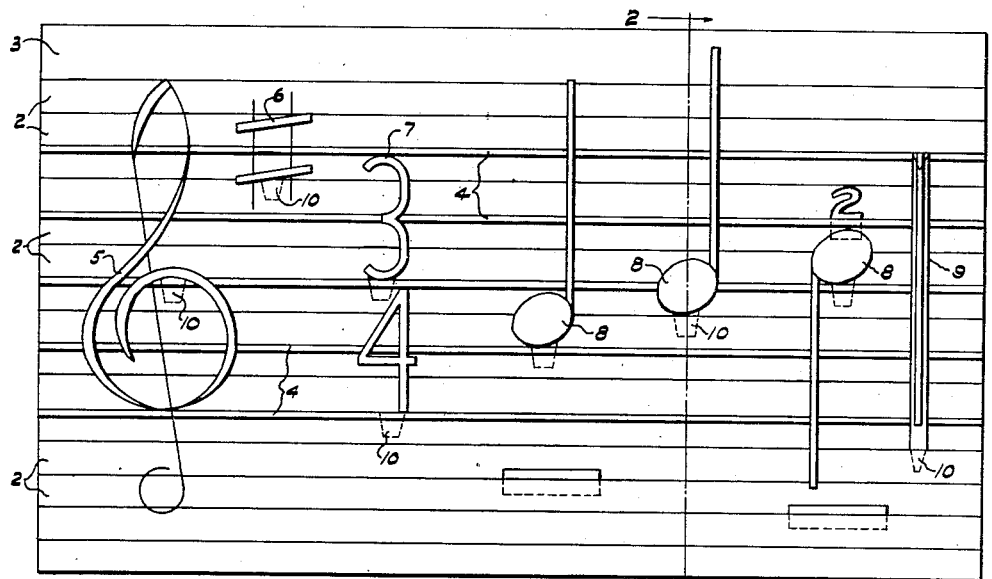
Figure 2:
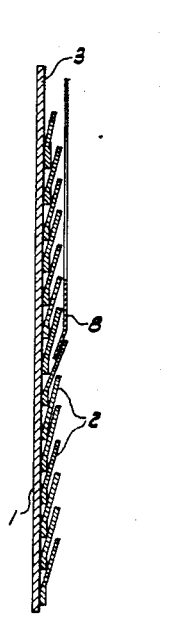
Figure 2 is a sectional view taken on line 2—2 of Figure 1 and showing the manner in which the detachable characters are mounted upon the chart.

Referring now to Figures 1 and 2, the improved chart structure comprises a foundation member or backing 1 to which is securely affixed a plurality of longitudinal strips 2 having appreciable stiffness in a transverse direction. These strips are secured along their lower sides to the member 1 and are separate from said member along their upper sides as indicated in Figure 2. Preferably the strips are of such width that a substantial portion of each strip overlaps the adjacent strip above it and lies in close contact with such adjacent strip.

It is contemplated that these strips will be formed of a flat material such as heavy cardboard or the like having a certain inherent resiliency. The lower portion of such strip may be glued or otherwise secured to the member 1 and in assembling the chart the respective upper strip will be mounted upon the member 1 before the adjacent lower strip is mounted. Since each strip of this flat material has its lower portion offset from its upper portion due to the method of assembly, the resiliency of the material will cause the upper portion of the strip to lie close to the lower portion of the adjacent strip and to form a snug recess therewith. As a consequence, the strips mutually reinforce each other and present to an observer even at a short distance the appearance of a single unbroken plane surface. As will be obvious, any desired number of strips may be used in the chart depending upon how far above or below the staff lines the music notation is to be carried. However, since the chart is best adapted for the teaching of elementary music it is contemplated that the average chart will contain from twelve to fifteen of such strips. With this convenient arrangement a space 3 upon member 1 at the top of the chart can then be provided for illustrating other music information such as printed scales in various other keys and aids of similar nature to the teacher and the student.

A staff consisting of spaced staff lines 4 is printed or otherwise shown upon appropriate strips 2. For convenience, these staff lines and other music characters are shown herein only in outline although it is intended that upon the actual chart they will appear customarily in a deep black color to contrast with the white color of the chart material. As will be obvious, the appearance of whole and fractional notes and all other characters will at all times follow the conventional markings.

For the purpose of teaching music by means of the structure as thus far described, a wide assortment of music characters, symbols, figures or the like is provided. These characters may be formed from cardboard or any other suitable material of requisite strength and are adapted to be inserted between the strips 2 at the designated location required for the proper notation. As one illustration of the flexibility and adaptability of the chart, Figure 1 shows the clef 5, the sharp 6, the time characters 7, the notes 8 and the measure bar 9. Each of these characters is provided with a depending integral tab portion 10 adapted to slide into the recess between adjacent strips 2 and to be held therein in frictional engagement.

In Figure 2 the manner in which the detachable character is held in place is illustrated. It has been found through actual usage of the present chart that the music characters tend to rest flush against the surface of the chart due to the resilient holding effect of the overlapping strips 2 upon the tab portions 10 of those characters. This feature is of importance in the teaching of this subject since the resulting appearance of the chart when holding the music notation is a faithful reproduction of conventional music notation. For example, each of the detachable characters lies across the staff lines and the body of each character is placed in the precise location demanded by conventional practice with respect to the staff. It is contemplated that the music characters may be cut integrally with the tabs 10 from a blank and thus have a relatively small thickness to insure a close fit against the body of the chart.

Figure 3:
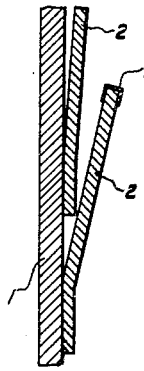
Figure 3 is a large scale view of a strip showing one manner in which the exposed edge of the strip may be protected from wear.
Figure 4:
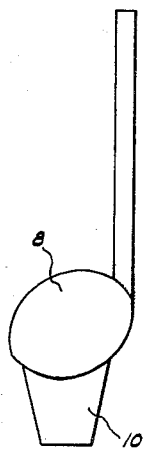
Figure 4 is a plan view of a music character adapted for use with the chart.
Figure 5:
Figure 5 is an elevation view of the music character shown in Figure 4.

In charts heretofore devised for serving this same general purpose it has been found that the removable characters and the means holding the characters on the chart rapidly become worn and torn through classroom use. Since the various characters are inserted and removed and shifted along the holding means, the useful life of such charts has been materially decreased. In the present invention it is unnecessary to pry open the strips 2 by means of the hands for the insertion of the characters since the integral tab means 10 serves to wedge open the recess between adjacent strips. As a further aid to reducing the wear upon the chart and to prevent tearing of the strips 2 a thin and tough strip 11 of suitable material is fastened along the exposed upper edge of each strip 2 before its assembly upon the foundation member 1. As seen in Figure 3, this wear resisting covering serves to prevent the transverse tearing of a strip due to accidental striking of the user's hand thereon or due to the fraying of the edge of such strips during continued use.

As will be apparent to those skilled in this art, all conventional music characters may be adapted to use with a chart of this construction and the omission of any characters from this disclosure does not indicate any limitation upon the utility of the construction. Charts employing the present invention are found to be well adapted to modern teaching methods requiring the active cooperation of the student in the instruction and due to the structural features above discussed it has been found that such charts not only have a longer useful life than those formerly employed, but also provide means for a more accurate and rapid teaching of music fundamentals.

Having thus disclosed the invention it is obvious that many variations in size, materials and assembly of the chart may be made without departing from the scope of the same. With the intention, therefore, of including in the above disclosure such changes as would occur to the person skilled in the art,

I claim:

In a music chart employing adjustable music characters having integral tab means extending from the body of the character, a backing, longitudinal strips having appreciable stiffness and mounted in vertically spaced, overlapping relation upon the backing to provide a secure recess for holding the tab means of the music characters between the strips, and spaced longitudinal staff lines located upon the exposed upper surfaces of certain of said strips with intermediate unmarked strips between adjacent staff line strips whereby an accurate music notation may be provided by the insertion of the tab means of the music characters between overlapping strips and for holding the music characters at the desired location with respect to the staff lines.

HAZEL ANN EVERSON.